US007702798B2

(12) United States Patent
Apreutesei et al.

(10) Patent No.: US 7,702,798 B2
(45) Date of Patent: Apr. 20, 2010

(54) PROVIDING CONTEXTUAL INFORMATION AUTOMATICALLY

(75) Inventors: Elena Apreutesei, Redmond, WA (US); Edward G. Simnett, Seattle, WA (US); Eran Shtiegman, Redmond, WA (US); Frank Shao, Kenmore, WA (US); Sahib Aulakh, Bellevue, WA (US); Marc Boyer, Seattle, WA (US); Thomas McNeill, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 616 days.

(21) Appl. No.: 11/470,827

(22) Filed: Sep. 7, 2006

(65) Prior Publication Data

US 2007/0071187 A1    Mar. 29, 2007

Related U.S. Application Data

(63) Continuation-in-part of application No. 11/190,489, filed on Jul. 26, 2005, now Pat. No. 7,623,643.

(51) Int. Cl.
*G06F 15/16* (2006.01)
(52) U.S. Cl. ...................... 709/227; 709/206
(58) Field of Classification Search .............. 709/206, 709/227
See application file for complete search history.

(56) References Cited

U.S. PATENT DOCUMENTS

| 6,353,398 B1 | 3/2002 | Amin et al. |
| 6,611,532 B1 | 8/2003 | Madour et al. |
| 6,672,506 B2 | 1/2004 | Swartz et al. |
| 6,741,188 B1 | 5/2004 | Miller et al. |

(Continued)

FOREIGN PATENT DOCUMENTS

WO    WO-2004/051916    6/2004

OTHER PUBLICATIONS

Gross, Tom, et al., "MatchBase: A Development Suite for Efficient Context-Aware Communication," Proceedings of 14th Euromicro Conference on Parallel, Distributed, and Network-Based Processing—PDP 2006, IEEE Computer Society Press, pp. 308-315.

(Continued)

*Primary Examiner*—George C Neurauter, Jr.
(74) *Attorney, Agent, or Firm*—Perkins Coie LLP

(57) ABSTRACT

A facility is described for providing contextual information automatically. In various embodiments, the facility receives an indication to start a conversation, automatically determines an identification for an item indicated by the indication, encodes the identification in a message, and sends the message so that a recipient of the message can locate the item. The facility can include a responder component and an initiator component. The initiator component can receive an identification for contextual information and an identification of the responder, initiate a conversation with the responder's computing device, and automatically encode the received indication of the contextual information in a message that it sends to the responder component so that the responder component can cause a link to the contextual information to be provided that, when selected, causes an application executing on the responder's computing device to load the contextual information. In various embodiments, the facility receives a message containing an indication of contextual information, decodes the indication to determine an identifier for the contextual information, and provides a command for loading the contextual information.

3 Claims, 14 Drawing Sheets

U.S. PATENT DOCUMENTS

| | | | |
|---|---|---|---|
| D494,584 S | | 8/2004 | Schlieffers et al. |
| 6,796,505 B2 | | 9/2004 | Pellaumail et al. |
| 6,837,436 B2 | | 1/2005 | Swartz et al. |
| 6,859,822 B2 | | 2/2005 | Olkin |
| 6,907,447 B1 | | 6/2005 | Cooperman et al. |
| 6,993,555 B2 | | 1/2006 | Kay et al. |
| 7,010,501 B1 | | 3/2006 | Roslak et al. |
| 7,040,541 B2 | | 5/2006 | Swartz et al. |
| 7,054,617 B2 | | 5/2006 | Thomsen et al. |
| 7,063,263 B2 | | 6/2006 | Swartz et al. |
| 7,139,370 B1 | * | 11/2006 | Tse .................. 379/88.17 |
| 7,171,378 B2 | | 1/2007 | Petrovich et al. |
| 7,195,157 B2 | | 3/2007 | Swartz et al. |
| 7,385,501 B2 | | 6/2008 | Miller et al. |
| 2001/0030664 A1 | | 10/2001 | Shulman et al. |
| 2003/0065768 A1 | * | 4/2003 | Malik .................. 709/224 |
| 2003/0112944 A1 | | 6/2003 | Brown et al. |
| 2003/0217109 A1 | | 11/2003 | Ordille et al. |
| 2004/0078432 A1 | | 4/2004 | Manber et al. |
| 2004/0078448 A1 | | 4/2004 | Malik et al. |
| 2004/0111479 A1 | * | 6/2004 | Borden et al. ............ 709/206 |
| 2004/0143632 A1 | | 7/2004 | McCarty |
| 2004/0201500 A1 | | 10/2004 | Miller et al. |
| 2005/0149622 A1 | | 7/2005 | Kirkland et al. |
| 2005/0177805 A1 | * | 8/2005 | Lynch et al. ............ 715/968 |
| 2005/0223069 A1 | | 10/2005 | Cooperman et al. |
| 2005/0235034 A1 | | 10/2005 | Chen et al. |
| 2005/0266858 A1 | | 12/2005 | Miller et al. |
| 2006/0019676 A1 | | 1/2006 | Miller et al. |
| 2006/0020677 A1 | | 1/2006 | von Koch |
| 2006/0029106 A1 | | 2/2006 | Ott et al. |
| 2006/0098624 A1 | * | 5/2006 | Morgan et al. ............ 370/352 |
| 2007/0036284 A1 | | 2/2007 | Raghav et al. |
| 2008/0090591 A1 | | 4/2008 | Miller et al. |
| 2008/0091537 A1 | | 4/2008 | Miller et al. |
| 2008/0161018 A1 | | 7/2008 | Miller et al. |

OTHER PUBLICATIONS

Hibino, Stacie and Mockus, Audris, "handiMessenger: Awareness-Enhanced Universal Communication for Mobile Users," Mobile HCI 2002 Conference Proceedings, Springer Verlag, pp. 170-183.

Resig, John and Teredesai, Ankur, "A Framework for Mining Instant Messaging Services," Data Mining Research Group, KDD 2004 Link Discovery Workshop, 8 pages.

Roach, A. B., "Session Initiation Protocol (SIP)—Specific Event Notification," Network Working Group, RFC 3265, Jun. 2002 (38 pages).

Rosenberg, J., et al., "SIP: Session Initiation Protocol," Network Working Group, RFC 3261, Jun. 2002 (269 pages).

U.S. Appl. No. 11/190,489, Raghav et al.

ShelExecuteEX Function, msdn, © 2009 Microsoft Corporation, 10 pages, http://msdn.microsoft.com/en-us/library/bb762154(VS.85,printer).aspx [last accessed Mar. 30, 2009].

PCT International Search Report, International Application No. PCT/US06/28995, Sep. 5, 2007.

* cited by examiner

PROVIDING CONTEXTUAL INFORMATION AUTOMATICALLY

CROSS-REFERENCE TO RELATED APPLICATION

This application is a continuation-in-part of U.S. patent application Ser. No. 11/190,489 entitled "AUGMENTING A CALL WITH CONTEXT," filed on Jul. 26, 2005, issued as U.S. Pat. No. 7,623,643 Nov. 24, 2009, which application is hereby incorporated by reference in its entirety.

BACKGROUND

People can use various "modalities" when conversing with others. Examples of modalities include electronic mail ("e-mail"), instant messaging, voice conferencing or messaging, video conferencing or messaging, facsimile ("fax"), web pages, web logs ("blogs"), Internet newsgroups, and so forth. In fact, a conversation may employ multiple modalities. As an example, user A may request information from user B via an e-mail message. User B may then respond to the request by telephoning user A, such as by using a device that communicates by employing Voice over Internet Protocol ("VoIP").

People sometimes provide contextual information, such as a common reference, so that the conversation can flow smoothly. During an oral exchange, for example, a person may remind another person about a conversation the two previously had. Users generally provide the common reference explicitly when using some electronic modalities (e.g., e-mail). As an example, when a sender sends an e-mail to a recipient, the recipient can reply to the message via e-mail. In such a case, the common reference can be the subject the sender identified in the e-mail message and the original text the sender typed into the e-mail message. The recipient's e-mail system may include the subject and this original text in the response.

Contextual information is conventionally not available to users when they use multiple modalities in a conversation. As a result, when users employ multiple modalities during a conversation, they may need to reestablish the common reference before beginning a meaningful dialog. As an example, when responding by telephone, user B may need to remind user A, who sends many e-mail messages, that user A previously sent an e-mail message to user B requesting information. User B may then proceed to provide the requested information orally by telephone. Users may even need to reestablish the common reference when they use a single modality, such as when using a modality that does not involve e-mail. When the responding user does not provide contextual information, the user initiating the conversation may find it difficult to recall what the conversation is about. This is especially true when one of the users carries on multiple conversations nearly simultaneously, such as via e-mail.

In some modalities, users must provide contextual information explicitly, such as by typing the information. As an example, when user A desires to discuss the contents of a document or a database record in an application with user B, user A must inform user B how to locate the document or database or provide some other indicative information so that user B has sufficient information to begin a meaningful conversation.

SUMMARY

A facility is described that provides contextual information automatically, such as when an instant messaging conversation starts. The facility can provide contextual information during both multi-modal and single-modal conversations. When a user ("initiator") initiates a conversation with another user ("responder") by selecting a command that is associated with an application corresponding to a document or other item about which the initiator desires to converse, an initiator component can transmit one or more properties to a responder component. The properties can include indications of contextual information and an identification of conversation participants (e.g., initiator and responders). When the responder component receives the message, it may interpret the properties to establish the contextual information. The contextual information can include a topic for the conversation and an identifier for the conversation. When the responder's computing device starts an application that enables the conversation to occur, the application can provide the established contextual information to the responder or enable the responder to access the contextual information. Thus, a user who initiates a conversation can cause the facility to provide contextual information automatically so that users can quickly correlate conversations, such as over time or when using different modalities.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A facility is described that provides contextual information automatically, such as when an instant messaging conversation starts. In various embodiments, the facility provides contextual information during both multi-modal and single-modal conversations. When a user ("initiator") initiates a conversation with another user ("responder") by selecting a command that is associated with an application corresponding to a document or other item about which the initiator desires to converse, an initiator component can transmit one or more properties to a responder component. The properties can include indications of contextual information and an identification of conversation participants (e.g., responders). The initiator component operates on the initiator's computing device and the responder component operates on the responder's computing device. The initiator component and responder component can be integrated with applications or can operate independently. The initiator component may send the properties in a message associated with a data communications protocol, such as within a Session Initiation Protocol message. When the responder component receives the message, it may interpret the properties the message contains to establish the contextual information. The contextual information can include a topic for the conversation, an identifier for the conversation, and an indication of other contextual information such as an associated document or other item. When the responder's computing device starts an application that enables the conversation to occur ("conversation application"), the conversation application can provide the established contextual information to the responder. As examples, the application can provide a subject or topic and a link (e.g., a URL) that, when selected, opens a document or other item associated with the conversation that the initiator referenced when initiating the conversation. Thus, a user who initiates a conversation can cause the facility to provide contextual information automatically so that users can quickly correlate conversations, such as over time or when using different modalities.

Figure 1A:
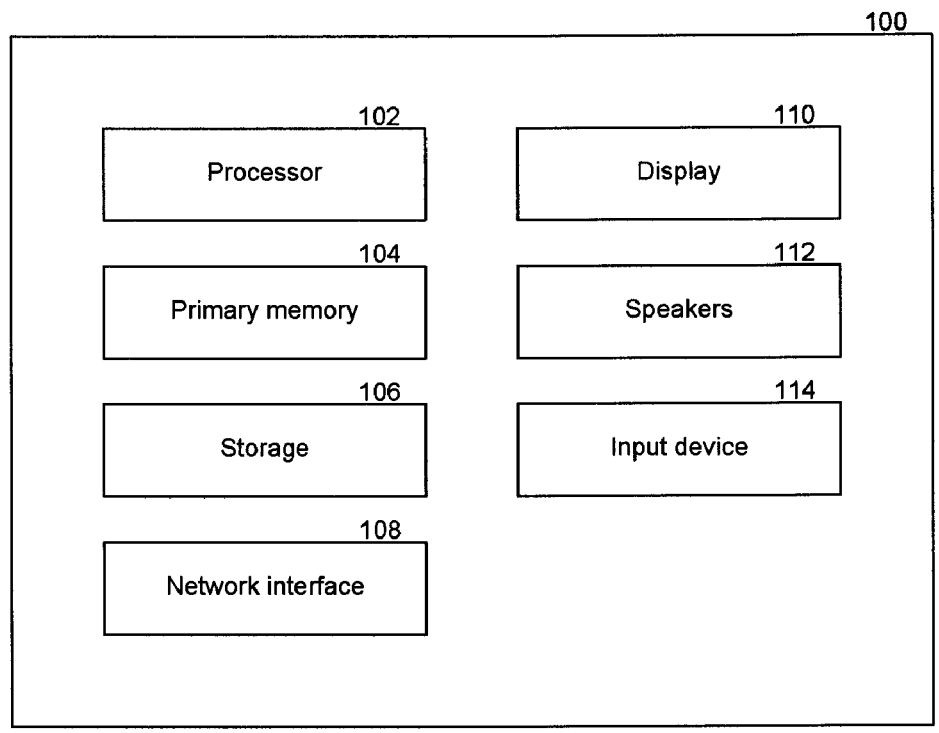
FIG. 1A is a block diagram illustrating an example of a suitable computing environment in which the facility may operate.

Turning now to the figures, FIG. 1A is a block diagram illustrating an example of a suitable computing environment 100 in which the facility may be implemented. A system for implementing the facility includes a general purpose computing device in the form of the computing system ("computer") 100. Components of the computer 100 may include, but are not limited to, a processing unit 102, a system primary memory 104, a storage unit 106, a network interface or adapter 108, a display 110, one or more speakers 112, and an input device 114.

The computer 100 typically includes a variety of computer-readable media that are operable with the storage unit 106. Computer-readable media can be any available media that can be accessed by the computer 100 and include both volatile and nonvolatile media and removable and nonremovable media.

The computer 100 may operate in a networked environment using logical connections to one or more remote computers. A remote computer may be a personal computer, a server, a router, a network PC, a peer device, or other common network node, and typically includes many or all of the elements described above in relation to the computer 100. A logical connection can be made via a local area network (LAN) or a wide area network (WAN), but may also include other networks. Such networking environments are commonplace in homes, offices, enterprisewide computer networks, intranets, and the Internet. The computer 100 can be connected to a network through the network interface 108, such as to a wired or wireless network.

The computer 100 is only one example of a suitable computing environment and is not intended to suggest any limitation as to the scope of use or functionality of the facility. Neither should the computing system environment be interpreted as having any dependency or requirement relating to any one or a combination of the illustrated components.

The facility is operational with numerous other general purpose or special purpose computing system environments or configurations. Examples of well-known computing systems, environments, and/or configurations that may be suitable for use with the facility include, but are not limited to, personal computers, server computers, handheld or laptop devices, cellular telephones, tablet devices, multiprocessor systems, microprocessor-based systems, set-top boxes, programmable consumer electronics, network PCs, minicomputers, mainframe computers, distributed computing environments that include any of the above systems or devices, and the like.

The facility may be described in the general context of computer-executable instructions, such as program modules, that are executed by a computer. Generally, program modules include routines, programs, objects, components, data structures, and so forth that perform particular tasks or implement particular abstract data types. The facility may also be employed in distributed computing environments where tasks are performed by remote processing devices that are linked through a communications network. In a distributed computing environment, program modules may be located in local and/or remote computer storage media, including memory storage devices.

Figure 1B:
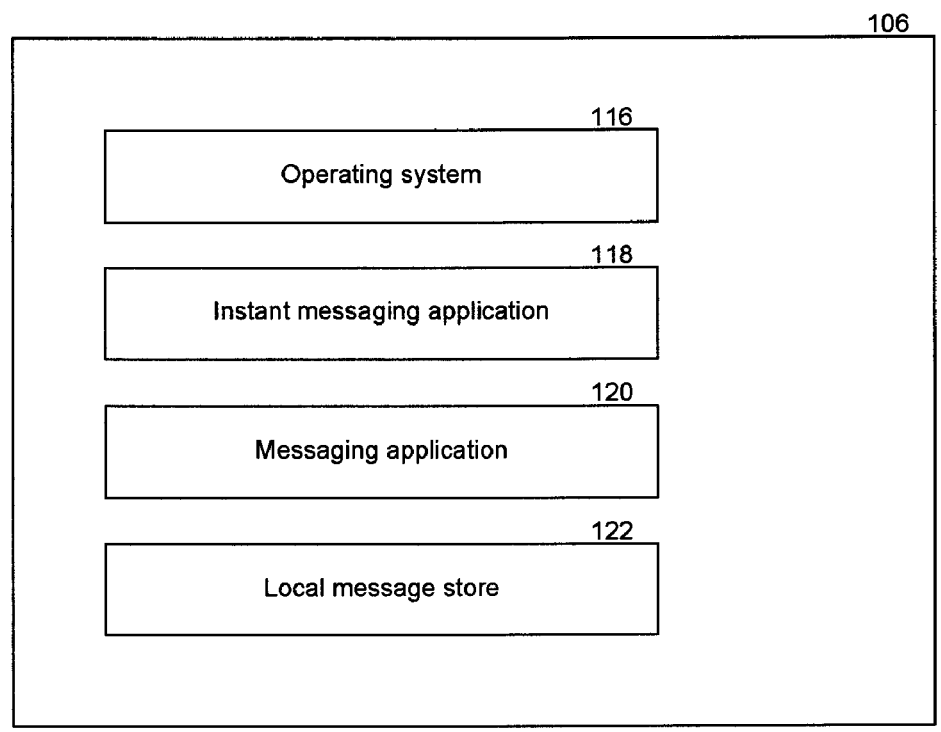
FIG. 1B is a block diagram illustrating a storage device of FIG. 1A in further detail in some embodiments.

FIG. 1B is a block diagram illustrating a storage device of FIG. 1A in further detail. According to the illustrated embodiment, the storage unit 106 stores an operating system 116, an instant messaging application 118, a messaging application 120, and a local message store 122. The instant messaging application can be an application such as MICROSOFT INSTANT MESSENGER or MICROSOFT OFFICE COMMUNICATOR. The instant messaging application is also referred to herein more generally as a "conversation application." In some embodiments, the instant messaging application is capable of communicating messages electronically, such as when the messages are typed, spoken, or otherwise input by a user. The instant messaging application can employ various protocols to send or receive messages, such as VoIP. In some embodiments, the messaging application communicates messages that are not conventionally considered to be "instant." Such messages can include, for example, e-mail. The local message store can be employed by applications, such as the messaging application, to store messages that they send or receive. The storage unit may also store other application programs and data (not illustrated).

While various functionalities and data are shown in FIGS. 1A and 1B as residing on particular computer systems that are arranged in a particular way, those skilled in the art will appreciate that such functionalities and data may be distributed in various other ways across computer systems in different arrangements. While computer systems configured as described above are typically used to support the operation of the facility, those skilled in the art will appreciate that the facility may be implemented using devices of various types and configurations, and having various components.

The techniques may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

FIGS. 2-5 are user interface diagrams illustrating portions of user interfaces associated with the facility in various embodiments.

Figure 2:
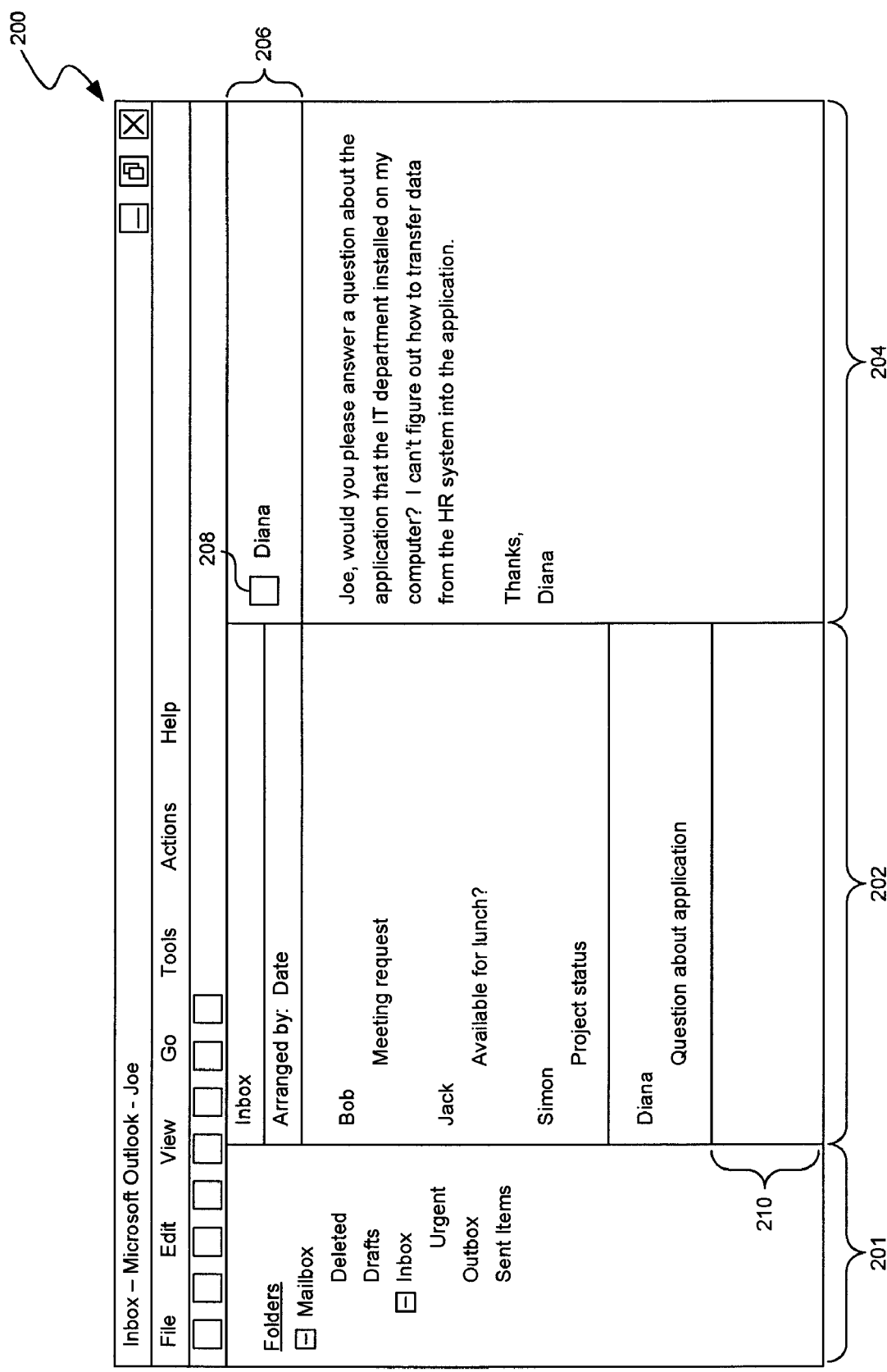
FIGS. 2-5 are user interface diagrams illustrating portions of user interfaces associated with the facility in various embodiments.

FIG. 2 is a user interface diagram illustrating a user interface associated with a messaging application, such as MICROSOFT OUTLOOK. This application is commonly employed to send and receive e-mail messages. The user interface 200 of the messaging application can include a folder region 201 for listing of e-mail folders and a list region 202 for listing e-mail messages that are associated with a selected folder. A content region 204 can display the contents of an e-mail message selected in the listing of e-mail messages. As an example, a message from Diana 210 is selected in list region 202 and its contents are displayed in content region 204. A header region 206 indicates that the message is from Diana. An online status indication 208 can appear in the user interface, such as within header region 206, that can indicate (e.g., using an icon, word, etc.) whether the person associated with the e-mail message (e.g., the sender of the e-mail message) is "online." A person is online when that person is available for instant online communications, such as using an instant messaging application or other conversation application. The instant messaging application can enable instant electronic communication with the person, such as by using typed or spoken information. The indication 208 of whether a person is online can also indicate whether the person is busy, away from the office, in a meeting, on the phone, and so forth. In various embodiments, the indication 208 can appear in the header region 206, list region 202, or elsewhere.

Figure 3:
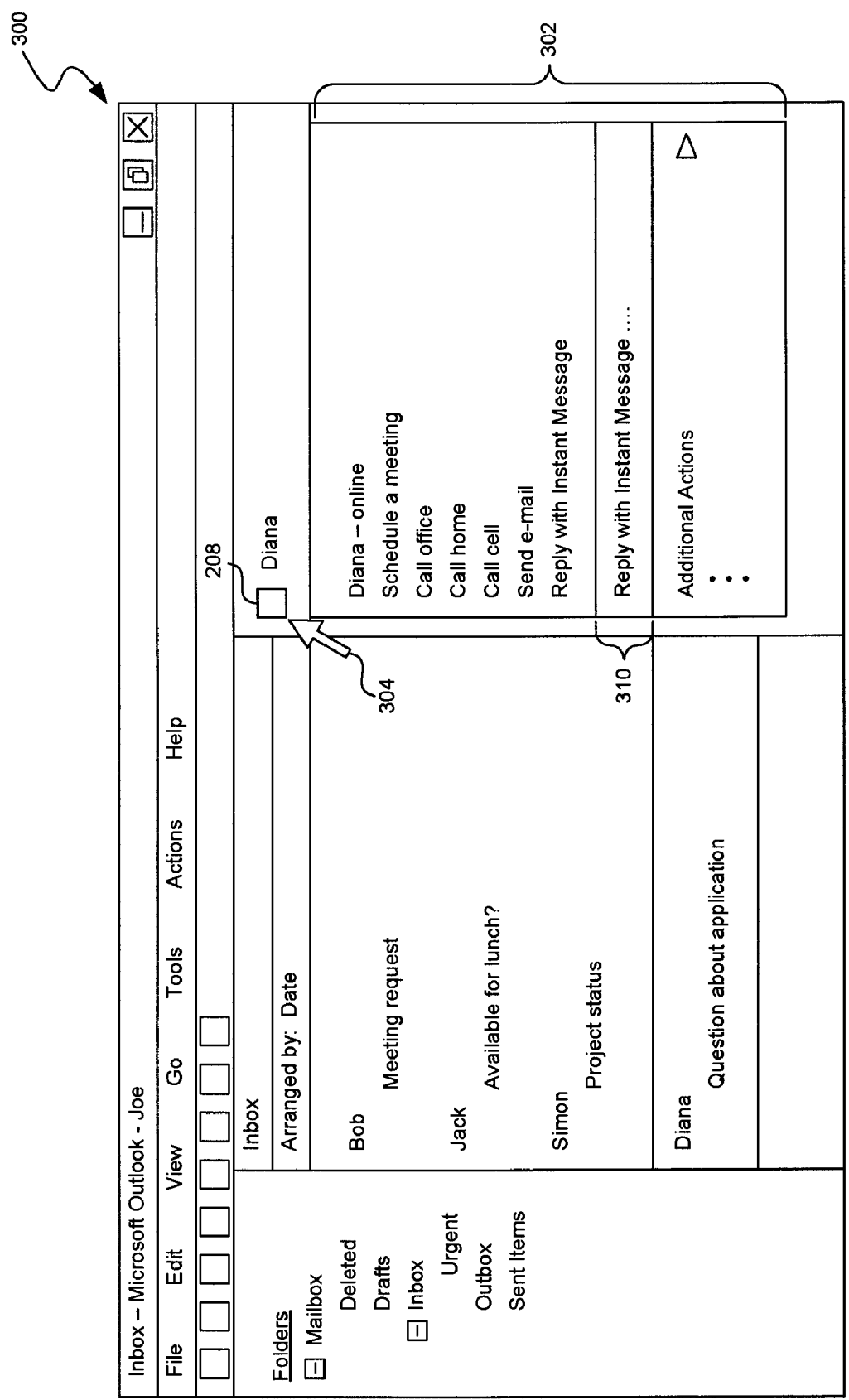

FIG. 3 is a user interface diagram illustrating the user interface of FIG. 2 in further detail. The user interface 300 displays a menu 302 that appears when commanded by a user, such as when the user positions a mouse pointer 304 near the online status indication 208. The menu provides status information and commands that the user can select. The status information can provide more explicit status information than provided by the indication 208. The commands that appear in the menu relate to actions the user can take in relation to communicating with the person associated with the selected message. As examples, the user can schedule a meeting, telephone the person associated with the selected message, send an e-mail, send an instant message, and so forth.

In some embodiments, the user can select a command 310 to reply with an instant message that includes contextual information. When selected, the command may cause a user interface associated with an instant messaging application to appear. An example of such a user interface appears in FIG. 4.

Figure 4:
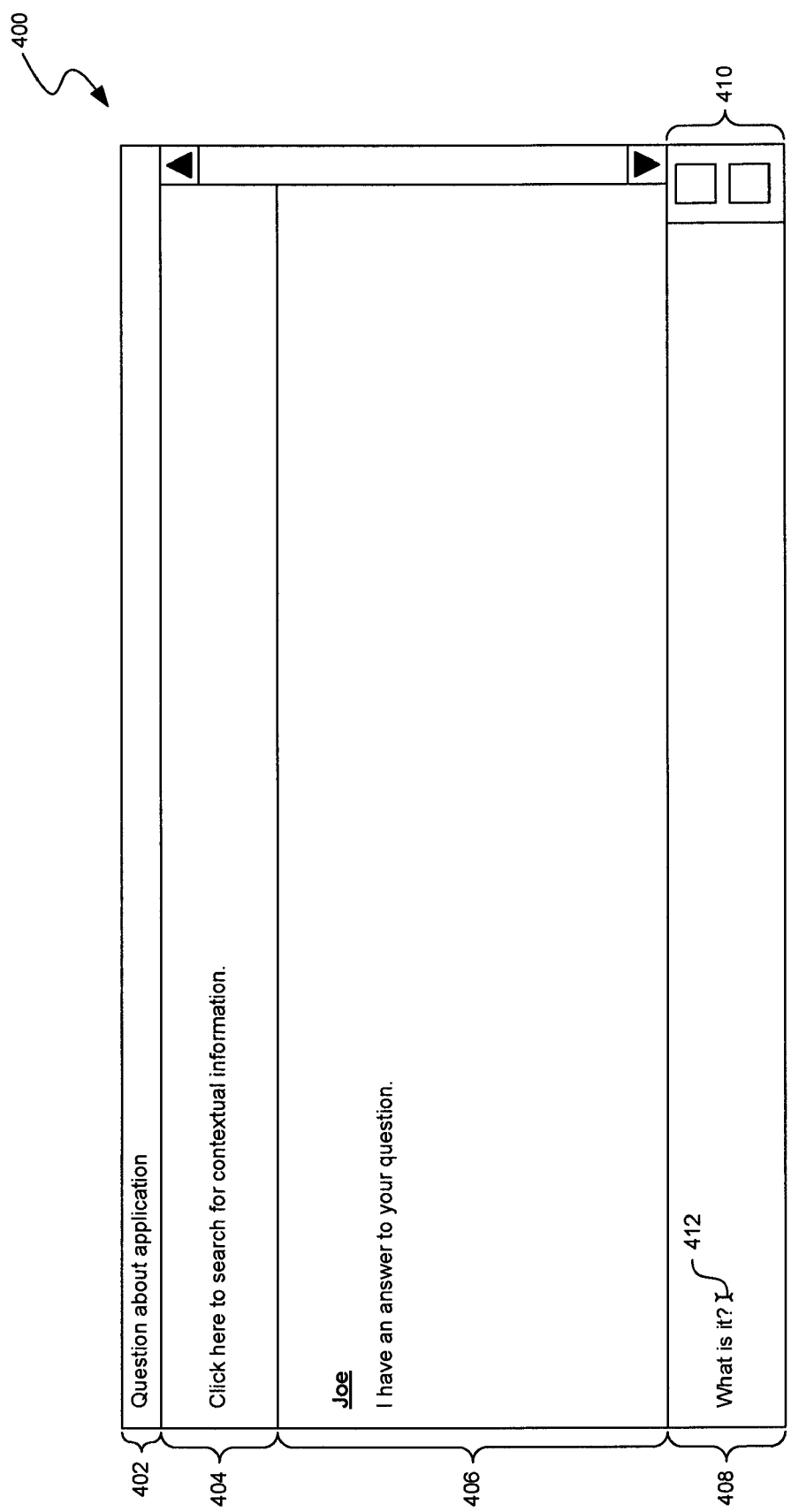
Figure 5:
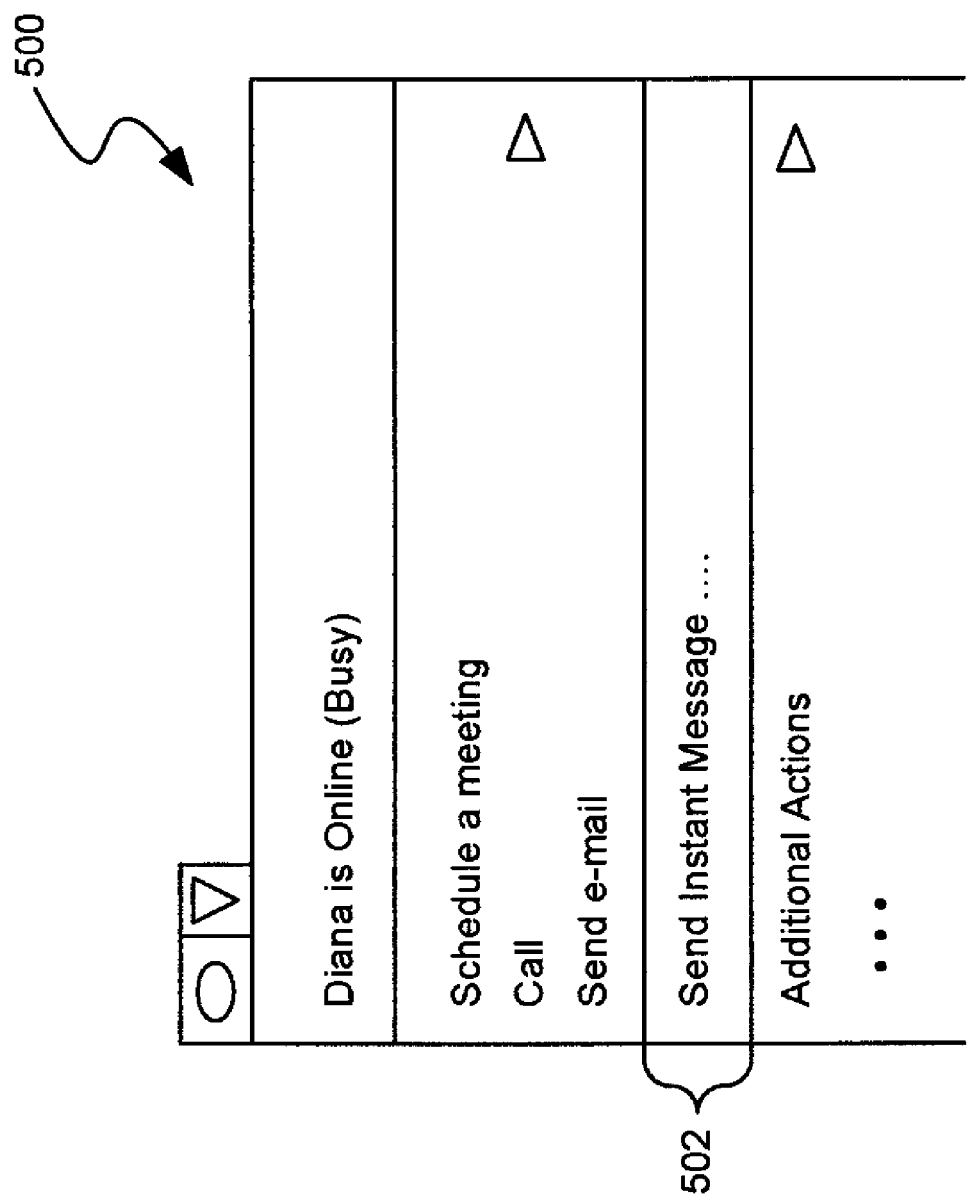

FIG. 4 is a user interface diagram illustrating a user interface associated with an instant messaging application. This user interface may appear on a computer display device associated with an initiator's computing device, responder's computing device, or both. In various embodiments, the user interface 400 includes a title region 402, a contextual information link region 404, a message region 406, an edit region 408, and a command region 410. The user can type in text in the edit region, such as beginning at the cursor 412. The user may also be able to add images, audio/video, and so forth. The user interface may appear when a responder receives an indication that an initiator desires to begin an instant messaging conversation and agrees to begin the conversation.

The title region can provide a title associated with the conversation. As an example, the title region can indicate a subject associated with the e-mail message that was selected when the user started the instant messaging conversation.

The contextual information link region can provide a link to contextual information. When the responder selects the displayed link, the facility may provide contextual information. As an example, the facility may display the associated e-mail message, document, or so forth. In some embodiments, the facility may search for associated contextual information. As an example, the facility may provide a token or other identifier associated with the document or e-mail message that was selected when the initiator began the conversation. A component on the initiator's computing device (e.g., initiator component) could send this token or other identifier in a message. A component on the responder's computing device (e.g., responder component) can provide the identifier to the instant messaging application. The instant messaging application may provide a link or other command that the responder can select. This link may also be sent in the message the responder component received. Alternatively, the link may be determined based on the received token or identifier. When the responder selects the displayed link or other command, a component on the responder's computing device (e.g., responder component) could search the responder's computing device or other device that is connected to a network for a document or e-mail message corresponding to the token or identifier. As an example, the component on the responder's computing device could search the local message store, server message store, or other device for the corresponding document or e-mail message. Upon locating this document or e-mail message, the component on the responder's computing device could cause the responder's computing device to display the located document or e-mail message.

The message region displays messages the initiator or responder types and sends as instant messages. In some embodiments, the information displayed in the contextual information link region can be displayed in the message region. In such cases the facility may or may not also display the information in the contextual information link region. The responder can select the link or command either in the contextual information link region or in the message region.

A user can employ the edit region to type information that can be sent to another user as an instant message. In various embodiments, the user can also provide images, audio information, or other media types.

The user can employ commands indicated in the command region to, e.g., send an instant message, add attachments or information, set options, and so forth.

The menu 302 in FIG. 3 can take other forms. As an example, the menu can be similar to the menu 500 illustrated in FIG. 5, which is a display diagram illustrating a portion of a user interface that is associated with the facility in some embodiments. The menu 500 can be employed in applications, such as when a user's status is displayed on a web page, document, and so forth. When a user selects a command 502, the facility can invoke an instant messaging application and send a token or identifier corresponding to the document, application, web page, or other component that displayed the user's status.

In various embodiments, the display diagrams can be reorganized. As examples, regions can be moved, functionality can be added or removed, etc. These changes can be made without deviating from the functionality described herein.

Figure 6:
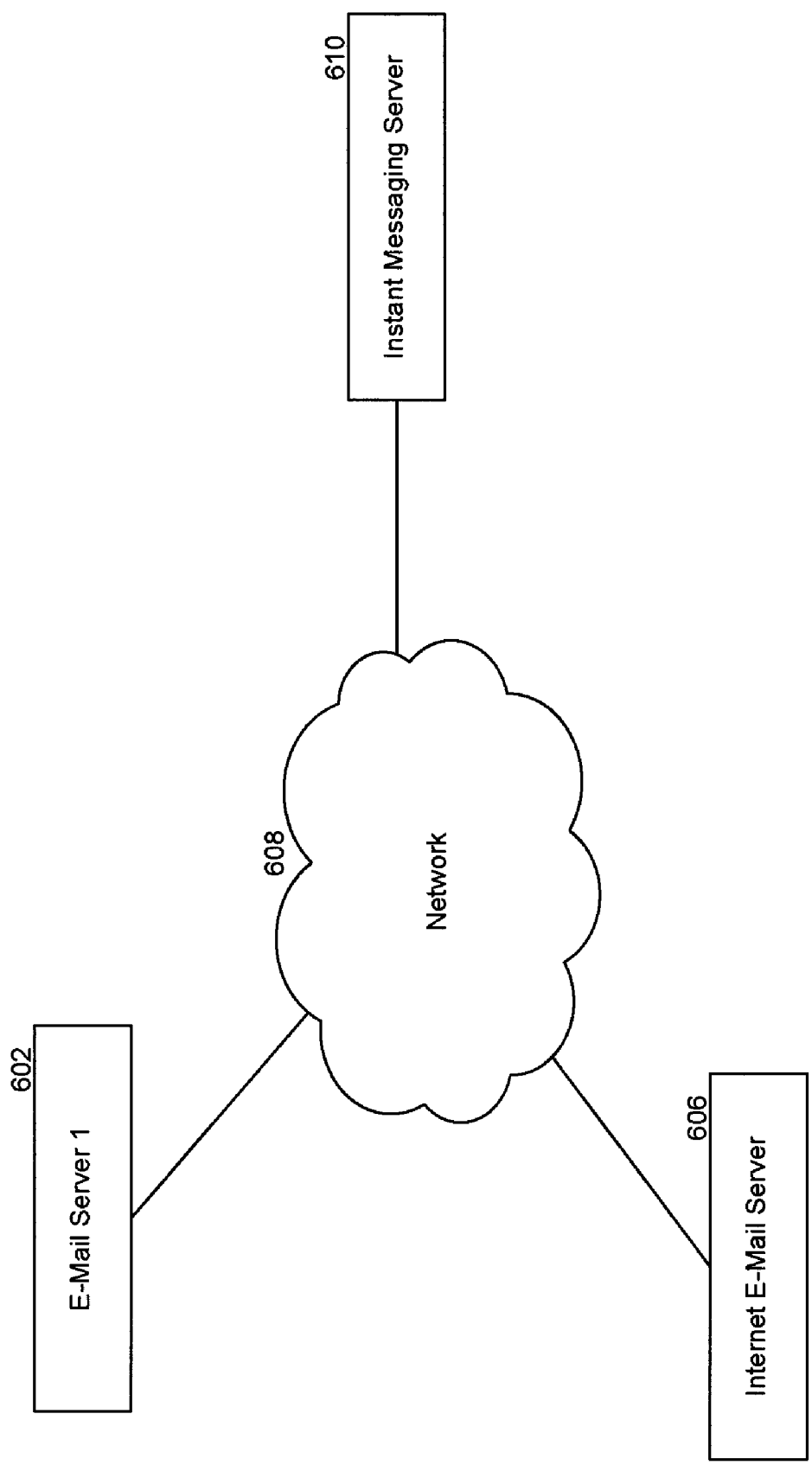
FIGS. 6-8 are block diagrams illustrating components of the facility in various embodiments.
Figure 7:
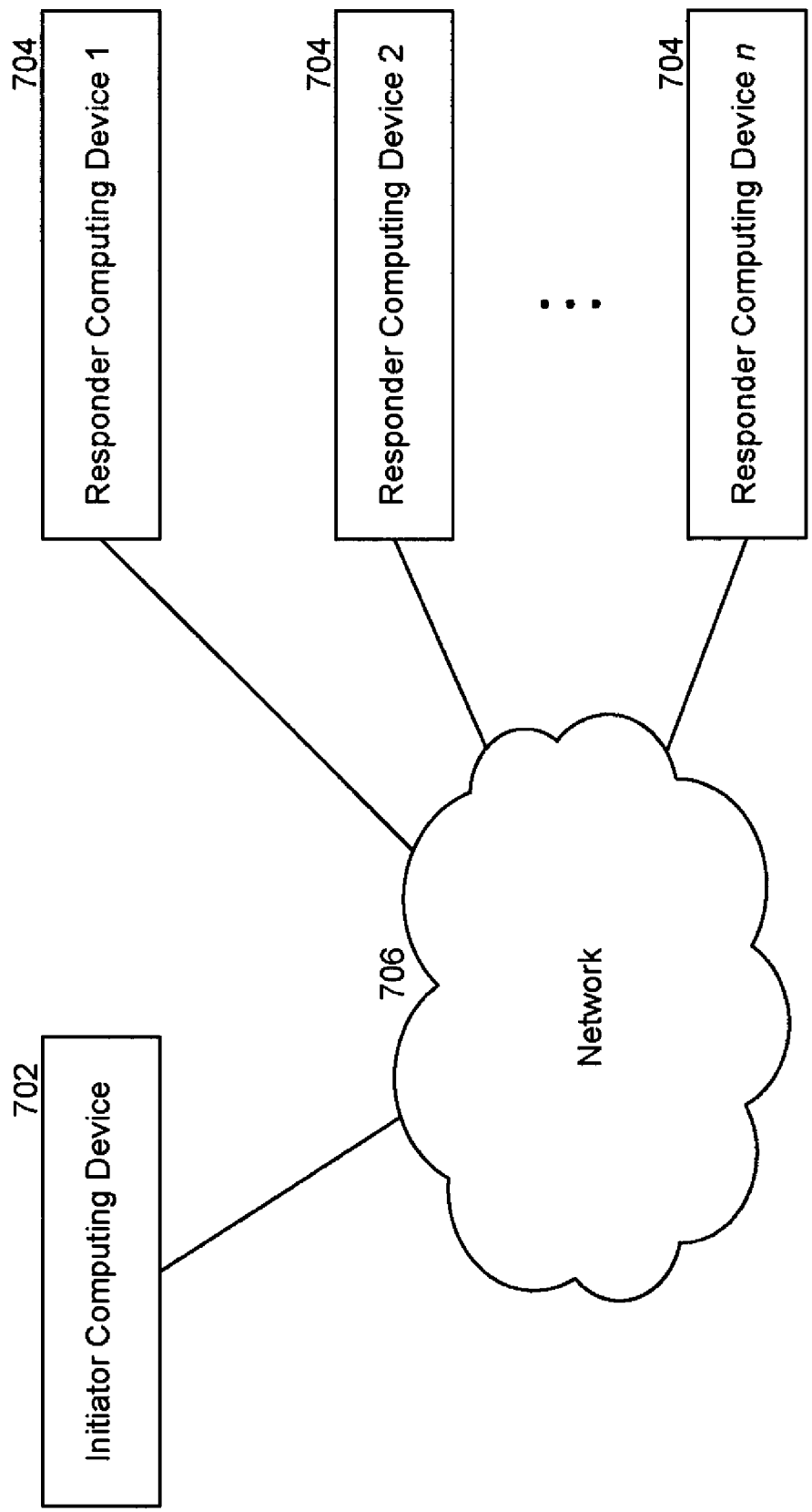
Figure 8:
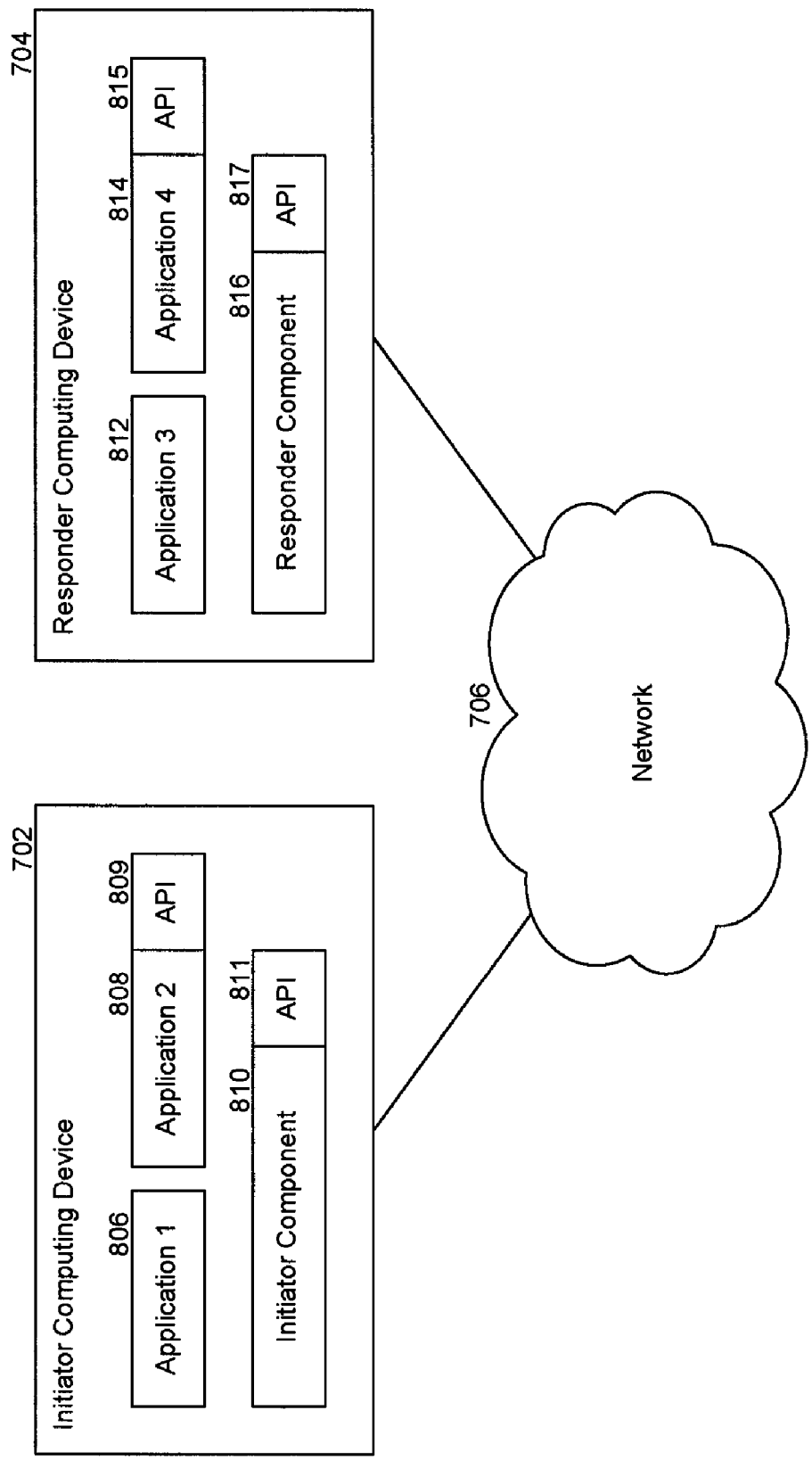

FIGS. 6-8 are block diagrams illustrating components of the facility in various embodiments.

FIG. 6 is a block diagram illustrating servers associated with the facility in various embodiments. The facility can employ one or more servers, such as an e-mail server 602, an Internet e-mail server 606, and an instant messaging server 610. The e-mail server can be an enterprise e-mail server, such as MICROSOFT EXCHANGE. The e-mail server can store e-mail, voice mail, facsimiles, documents, and other information in an electronic mailbox associated with one or more users. The e-mail server can be associated with other servers, such as file servers, telephone exchanges ("PBX"), facsimile machines or servers, and so forth. In various embodiments, the facility may employ multiple e-mail, Internet e-mail, and instant messaging servers. As an example, when a PBX determines that a person is not answering the person's telephone, it may record a voice message and store the voice message in the person's electronic mailbox on the e-mail server. Similarly, a facsimile server may receive a facsimile and store the facsimile in the recipient's electronic mailbox. A user can access his or her electronic mailbox using a client application, such as MICROSOFT OUTLOOK. The servers may be interconnected via a network 608, such as an intranet, the Internet, or both.

FIG. 7 is a block diagram illustrating devices associated with the facility in various embodiments. The facility can employ one or more initiator computing devices 702 and one or more responder computing devices 704. Typically in a given conversation, a single initiator computing device initiates the conversation with one or more responder computing devices. However, multiple initiator computing devices can initiate one or more conversations with one or more responder computing devices. An initiator computing device may be a responder computing device in a conversation initiated by another computing device. Similarly, a responder computing device can become an initiator computing device by initiating a conversation. A computing device may be both an initiator and responder computing device simultaneously, such as in separate conversations. The initiator and responder computing devices may communicate via a network 706. These devices may communicate by employing a protocol, such as Session Initiation Protocol ("SIP"), or other protocol capable of delivering "instant messages," such as MICROSOFT's instant messaging protocols, Presence and Instant Messaging Protocol, Extensible Messaging and Presence Protocol (commonly referred to as "Jabber"), and Instant Messaging and Presence Service, and so forth. In various embodiments, the initiator and responder may be using different protocols and may employ the services of a protocol translator to translate messages between the protocols. In various embodiments, the initiator and responder computing devices may include input and output devices for receiving or rendering text, images, audio, video, and so forth. As an example, a computing device may be attached to a handset similar to a conventional telephone so that an audio conversation can accompany the display of text or images on a computer monitor. In some embodiments, the computing devices may be attached to other devices, such as telephones, printers, monitors, mice, speakers, microphones, video cameras, still cameras, and other input/output devices.

FIG. 8 is a block diagram illustrating initiator and responder computing devices of FIGS. 7 in further detail as employed in various embodiments. The initiator computing device 702 can include one or more applications, such as applications 806 and 808. One or more of these applications may have an application programming interface ("API") component 809 that other components can employ to control the application. As an example, a communications application may provide an API to control communications. Alternatively, an application may have an API that components of the facility can use to control the application. As an example, a Customer Relationship Management application may provide an API to retrieve and display information about a specified customer record. The initiator computing device may also have an initiator component 810 and an API component 811 that is associated with the initiator component. The initiator component's API component enables other components to control the initiator component, such as to begin a conversation. In some embodiments, the initiator component sends contextual information to the responder computing device.

The responder computing device 704 can include one or more applications, such as applications 812 and 814. Some of these applications may include an API, such as API 815 that is associated with application 814. This API may provide features similar to API 809. As an example, API 815 may enable another component to control application 814. The responder computing device may also have a responder component 816 and an associated API component 817. In various embodiments, the responder component can receive contextual information from the initiator component. Upon doing so, the responder component may search for information, such as by employing API 815 to locate information and provide the located information to the user. As an example, the responder component may receive contextual information from the initiator component that indicates a particular e-mail thread. The responder component could then employ an API associated with MICROSOFT OUTLOOK to locate the last e-mail message of the thread and display the located e-mail message.

In some embodiments, applications or other components may use API 817 to control the responder component or to receive information from the responder component.

Initiator and responder computing devices 702 and 704, respectively, may employ a network 706 to communicate with one another. The network may be an intranet, the Internet, or some combination of these or other networks.

Figure 9:
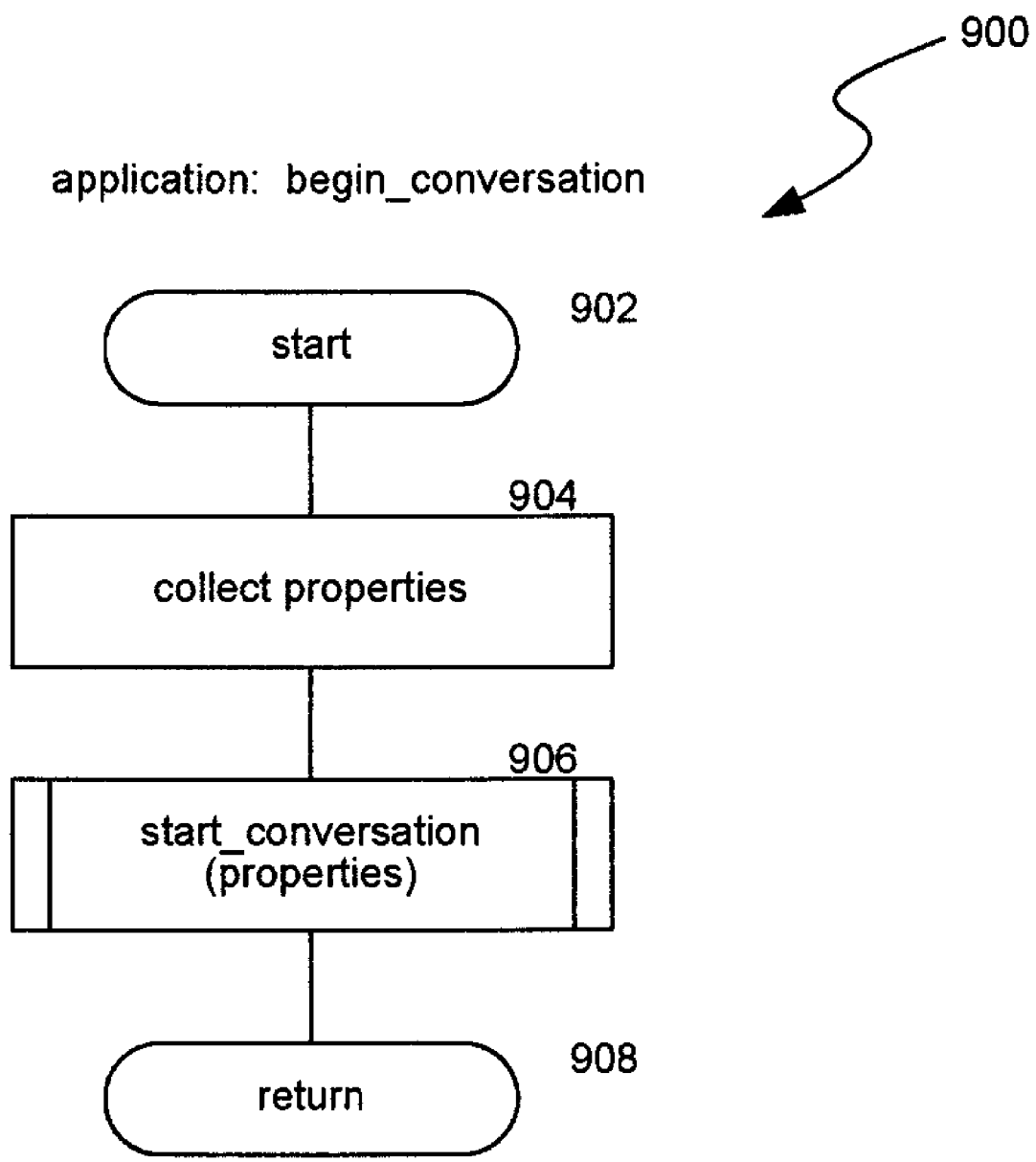
FIG. 9 is a flow diagram illustrating a begin_conversation routine invoked by the facility in various embodiments.

FIG. 9 is a flow diagram illustrating a begin_conversation routine invoked by the facility in various embodiments. An application can invoke the begin_conversation routine 900 when a user, e.g., an initiator, indicates to begin a conversation relating to a particular item or document. As an example, the initiator may indicate to begin a conversation in relation to an e-mail message that the initiator has received. The routine begins at block 902.

At block 904, the routine collects various properties. Examples of properties it can collect can include conversation identifiers, subject strings, and other properties that could uniquely identify a particular item or document, such as a Uniform Resource Locator ("URL"). As another example, when using MICROSOFT's Messaging API (commonly referred to as "MAPI"), the routine may collect PR_CONVERSATION_TOPIC and PR_CONVERSATION_INDEX properties. The PR_CONVERSATION_TOPIC generally identifies the subject string provided in an e-mail message by the user that first sent the e-mail message. Even when subsequent recipients change the subject string when responding, the PR_CONVERSATION_TOPIC property's value may not change. However, the subject and PR_CONVERSATION_TOPIC may not uniquely identify an e-mail message or thread.

The PR_CONVERSATION_INDEX property generally uniquely identifies messages in a thread. As an example, a first message in an e-mail thread is provided a PR_CONVERSATION_INDEX value that uniquely identifies the message. In some embodiments, the value is a binary value having six bytes and a sixteen-byte globally unique identifier ("GUID"). The PR_CONVERSATION_INDEX value for a subsequent response contains the PR_CONVERSATION_INDEX value of the first message and an appended additional value. As an example, five bytes may be appended to the PR_CONVERSATION_INDEX of the first message, resulting in a 27-byte value. Further responses append values to either the PR_CONVERSATION_INDEX value of the first message or a subsequent response, depending on which message is being responded to. By analyzing the PR_CONVERSATION_INDEX value of messages, it is possible to determine the position of each message in a thread of messages. As examples, it is possible to determine the first, last, or a particular message in a thread.

Various e-mail servers and client applications employ MAPI and this message identification scheme, including MICROSOFT EXCHANGE and MICROSOFT OUTLOOK, which are server and client application products, respectively. Thus, when an initiator begins a conversation from MICROSOFT OUTLOOK, such as by indicating to start a conversation relating to an identified e-mail message, the initiator component may collect the PR_CONVERSATION_INDEX property for sending to the responder's computing device. The initiator component may send a URL as a property identifying a document which the initiator indicates to start a conversation about. The properties can also include an indication of participants that are to be invited to the conversation. As an example, the initiator may indicate that a sender of an e-mail message is to be invited to the conversation. Alternatively, the initiator may indicate that several people are to be invited to the conversation, such as all recipients of an e-mail message.

At block 906, the routine invokes a start_conversation subroutine to start the conversation and provides one or more of the collected properties to the subroutine. The start_conversation subroutine is described in further detail below in relation to FIG. 10.

At block 908, the routine returns.

Figure 10:
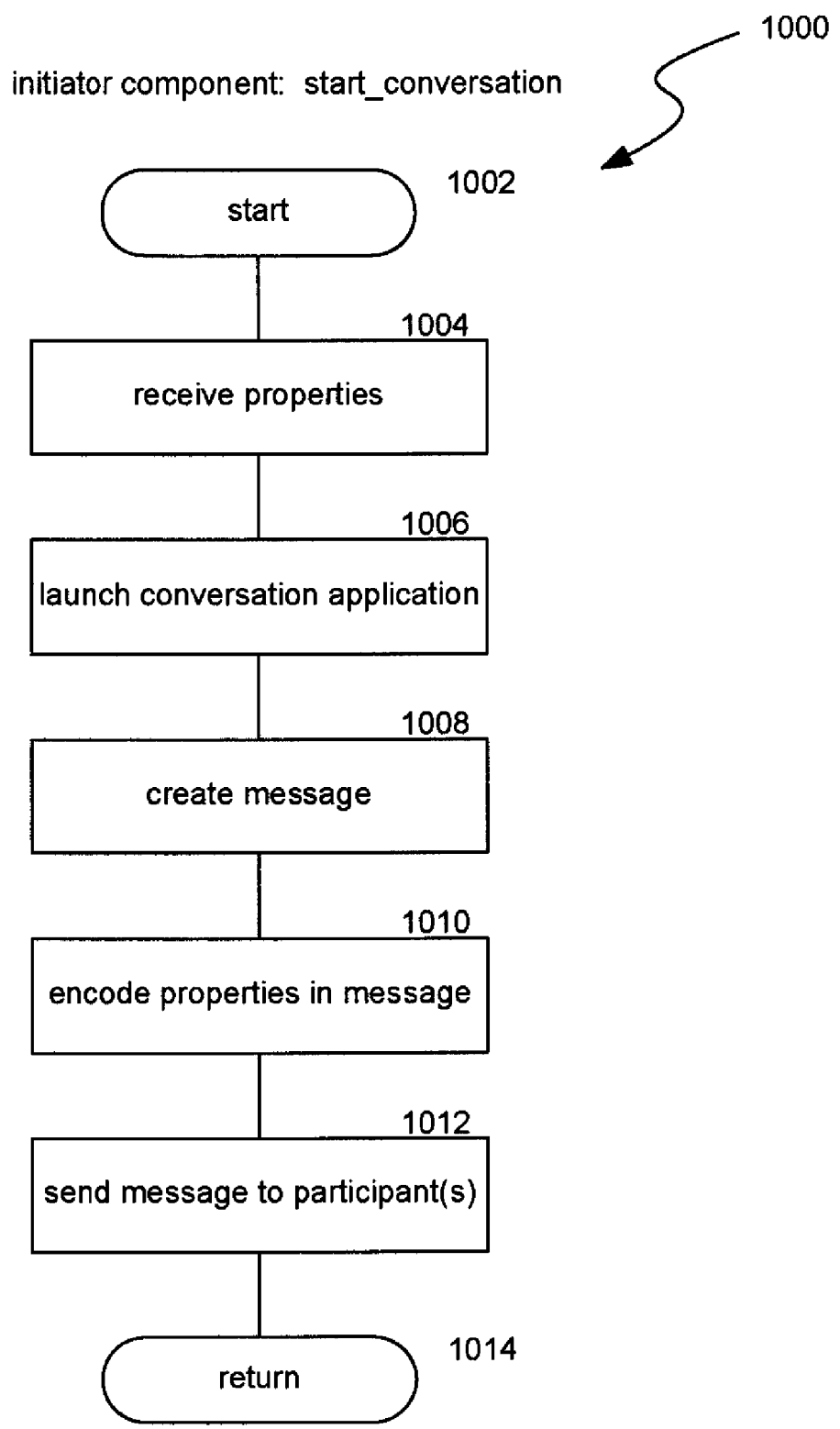
FIG. 10 is a flow diagram illustrating a start_conversation routine invoked by the facility in various embodiments.

FIG. 10 is a flow diagram illustrating the start_conversation routine invoked by the facility in various embodiments. An initiator component may invoke the routine 1000, such as when an application attempts to begin a conversation. The application may employ an API that is associated with the initiator component when beginning the conversation. Alternatively, the application may invoke an API that is associated with another application, such as a real-time collaboration application. The other application may then employ the initiator component's API to start the conversation. The routine begins at block 1002.

At block 1004, the routine receives properties, such as properties provided by the application when it invoked the begin_conversation routine. In this routine and other routines described herein, the properties can be received as parameters that are provided when the routine is invoked. In various embodiments, the properties can include an indication of one or more participants (e.g., responders), identification of contextual information, and a conversation identifier. In some embodiments, a property may indicate the importance of a conversation. When a conversation is marked as having more importance than another conversation, the facility may provide additional resources to the more important conversation so that conversation message throughput can be enhanced.

At block 1006, the routine launches a conversation application. As an example, the routine may launch MICROSOFT OFFICE COMMUNICATOR, which is a conversation application that enables users to communicate in real time using text, images, audio/video, and other modalities. This conversation application also integrates instant messaging and telephone (e.g., using VoIP) functionality so that, for example, a user can initiate a telephone call using a computing device or work on a document jointly with other users while simultaneously speaking with them.

At block 1008, the routine creates a message. In various embodiments, the message may indicate to its recipients to start a conversation, such as by inviting a recipient to a conversation. As an example, the message can be a SIP INVITE message. An INVITE message is employed by SIP systems to indicate that one entity is inviting another entity to a conversation.

At block 1010, the routine encodes one or more of the properties it received at block 1004 into the message it has created. As an example, the routine may provide an identifier relating to the conversation in the message, such as a message's PR_CONVERSATION_INDEX or a URL. In some embodiments, the initiator component may also encode a PR_ENTRY_ID property that uniquely identifies a particular e-mail message or other item that the initiator desires to converse about. As an example, when the initiator starts a VoIP conversation from a particular e-mail message, the initiator component may encode that e-mail message's unique identifier as the PR_ENTRY_ID property.

At block 1012, the routine sends the message to participants indicated in the received properties.

At block 1014 the routine returns.

Figure 11:
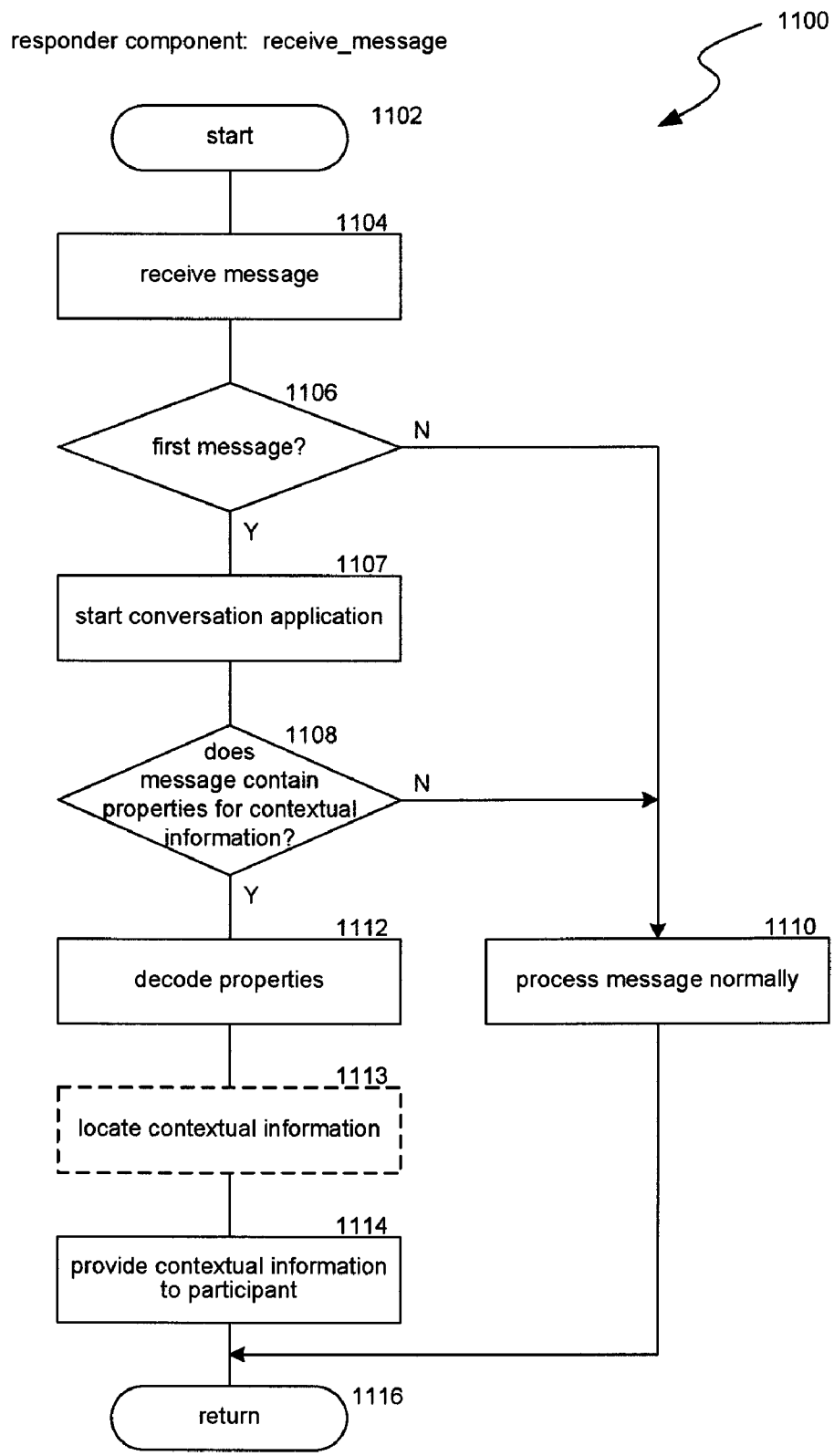
FIG. 11 is a flow diagram illustrating a receive_message routine invoked by the facility in various embodiments.

FIG. 11 is a flow diagram illustrating a receive_message routine invoked by the facility in various embodiments. A responder component may invoke the routine 1100 when it receives a message. The routine begins at block 1102.

At block 1104, the routine receives a message. As an example, the routine may receive a message that was sent by the initiator component. The message may be a SIP INVITE message, which is an invitation to begin a conversation.

At block 1106, the routine determines whether this is the first message in a conversation. The routine can determine whether this is the first message in the conversation by either keeping track of messages in a conversation or by checking a property of the message, such as whether the message is a SIP INVITE message. If it is the first message in a conversation, the routine continues at block 1107. Otherwise, the routine continues at block 1110.

At block 1107, the routine starts a conversation application. As an example, the routine starts MICROSOFT OFFICE COMMUNICATOR. This conversation application was described in further detail above.

At block 1108, the routine determines whether the message contains properties for contextual information. As an example, the routine determines whether the message contains a property indicating a conversation identifier, such as a PR_CONVERSATION_INDEX property, URL, etc. If the message contains properties for contextual information, the routine continues at block 1112. Otherwise, the routine continues at block 1110.

At block 1110, the routine processes the received message in a normal fashion. As an example, when the message is not a first message in a conversation or does not contain properties for contextual information, the routine processes the message normally, such as by providing text in a text window associated with the conversation application, playing audio on a speaker or headset, etc.

At block 1112, the routine decodes the properties the received message contains. As an example, the routine identifies a portion of the message that indicates a PR_CONVERSATION_INDEX property, URL, etc.

At block 1113, the routine optionally locates the indicated contextual information. As an example, if the decoded property includes a PR_CONVERSATION_INDEX property, the routine may request MICROSOFT OUTLOOK (or other e-mail component) to locate an e-mail message corresponding to the PR_CONVERSATION_INDEX value, such as a first e-mail in the thread, last e-mail in the thread, or a particular e-mail message. As another example, if the decoded property includes a URL, the routine may locate a document or other item corresponding to the URL.

At block 1114, the routine provides the contextual information to the participant. As an example, the routine may provide the text in a text window associated with the conversation application. Alternatively, the routine may render audio or display a document to the user. In such a case, the routine may launch the application (e.g., e-mail client or Internet browser application) corresponding to the located item or document and provide an indication of the located item or document to the launched application. In various embodiments, the routine may add a link or other button in the launched application (e.g., conversation application) instead of displaying or otherwise rendering the document or item. As an example, the routine may provide a link or button in a window of the conversation application so that when the responder selects the link or button, the application corresponding to the located item or document is launched.

At block 1116, the routine returns.

Figure 12:
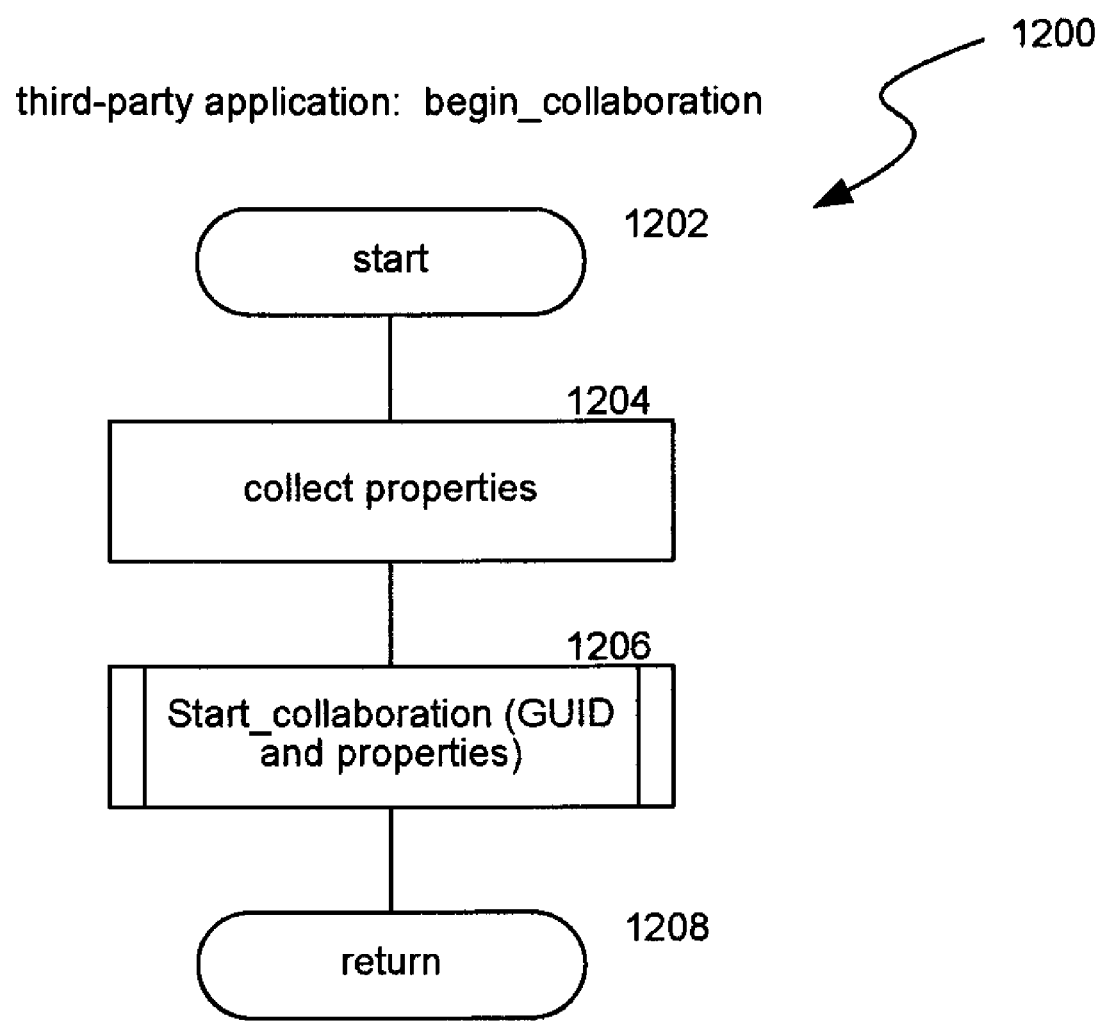
FIG. 12 is a flow diagram illustrating a begin_collaboration routine invoked by the facility in various embodiments.

FIG. 12 is a flow diagram illustrating a begin_collaboration routine invoked by the facility in various embodiments. An application may invoke the routine 1200 to begin a conversation from the application. As an example, a third-party application that is not otherwise associated with the facility may perform the routine when employing the facility to begin a conversation, such as when an initiator desires to communicate with a responder about a particular entry or record in the third-party application. A software developer of the third-party application could provide a user interface control to begin a conversation. When the initiator selects the user interface control or otherwise commands the third-party application, the third-party application can invoke the routine. The routine begins at block 1202.

At block 1204, the routine collects properties. As an example, the routine can collect properties that the third-party application provides to identify the conversation. As an example, the routine can collect an identifier for the record or entry that the initiator has selected.

At block 1206, the routine invokes a start_collaboration subroutine and provides an identifier, such as a GUID and other properties to the subroutine. The start_collaboration subroutine is described in further detail below in relation to FIG. 13. The third-party application provides a GUID that is associated with the third-party application. As an example, when the third-party application is installed, it may register a GUID, such as by storing a value in a registry and a path to a component associated with the third-party application. The GUID can be used by a component on the responder's computing device to identify a registered component.

At block 1208, the routine returns.

Figure 13:
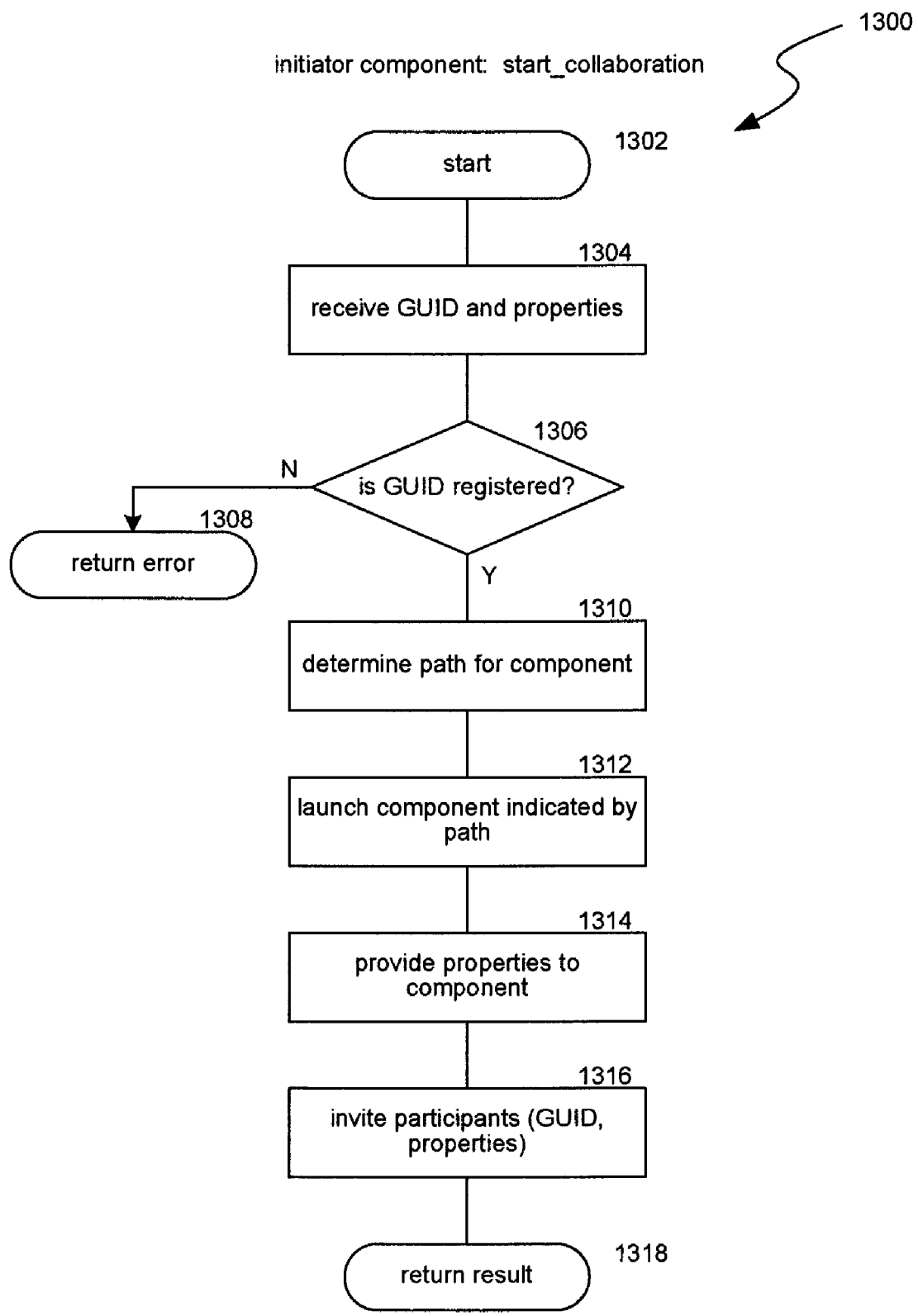
FIG. 13 is a flow diagram illustrating a start_collaboration routine invoked by the facility in various embodiments.

FIG. 13 is a flow diagram illustrating a start_collaboration routine invoked by the facility in various embodiments. An initiator component performs the routine 1300, such as when invoked by an application. The application may be a third-party application. The application can cause the initiator component to perform the routine by invoking a method of an API that is provided by the initiator component. The routine begins a block 1302.

At block 1304, the routine can receive a GUID and other properties. The GUID and other properties can identify the conversation, an item or record associated with the application, participants with whom to initiate the conversation, and so forth.

At block 1306, the routine determines whether the GUID indicates a registered application or component. As an example, the routine determines whether the GUID is registered in a registry. If the GUID is registered, the routine continues at block 1310. Otherwise, the routine continues at block 1308 where it returns an error.

At block 1310, the routine determines a path to the application or component. As an example, a registry key associated with the GUID may indicate a path to the component or application. The path indicates a location where the component can be found. Thus, the path can be a URL, a folder location, a fully qualified identification of a component using a Universal Naming Convention (also referred to as "UNC") and so forth.

At block 1312, the routine launches the component or application indicated by the path determined at block 1310.

At block 1314, the routine provides one or more of the properties it received at block 1304 to the component that it launched at block 1312. As an example, it may provide an indication of a record or item corresponding to the conversation and a conversation identifier.

At block 1316, the routine invites the participants. As an example, the routine may cause a conversation application to invite the participants. When inviting the participants, the routine may provide the GUID and/or one or more of the properties it received at block 1304.

At block 1318, the routine returns a result to the component that invoked the routine. As an example, the routine may indicate whether the application or components successfully launched, participants were invited, or so forth.

Figure 14:
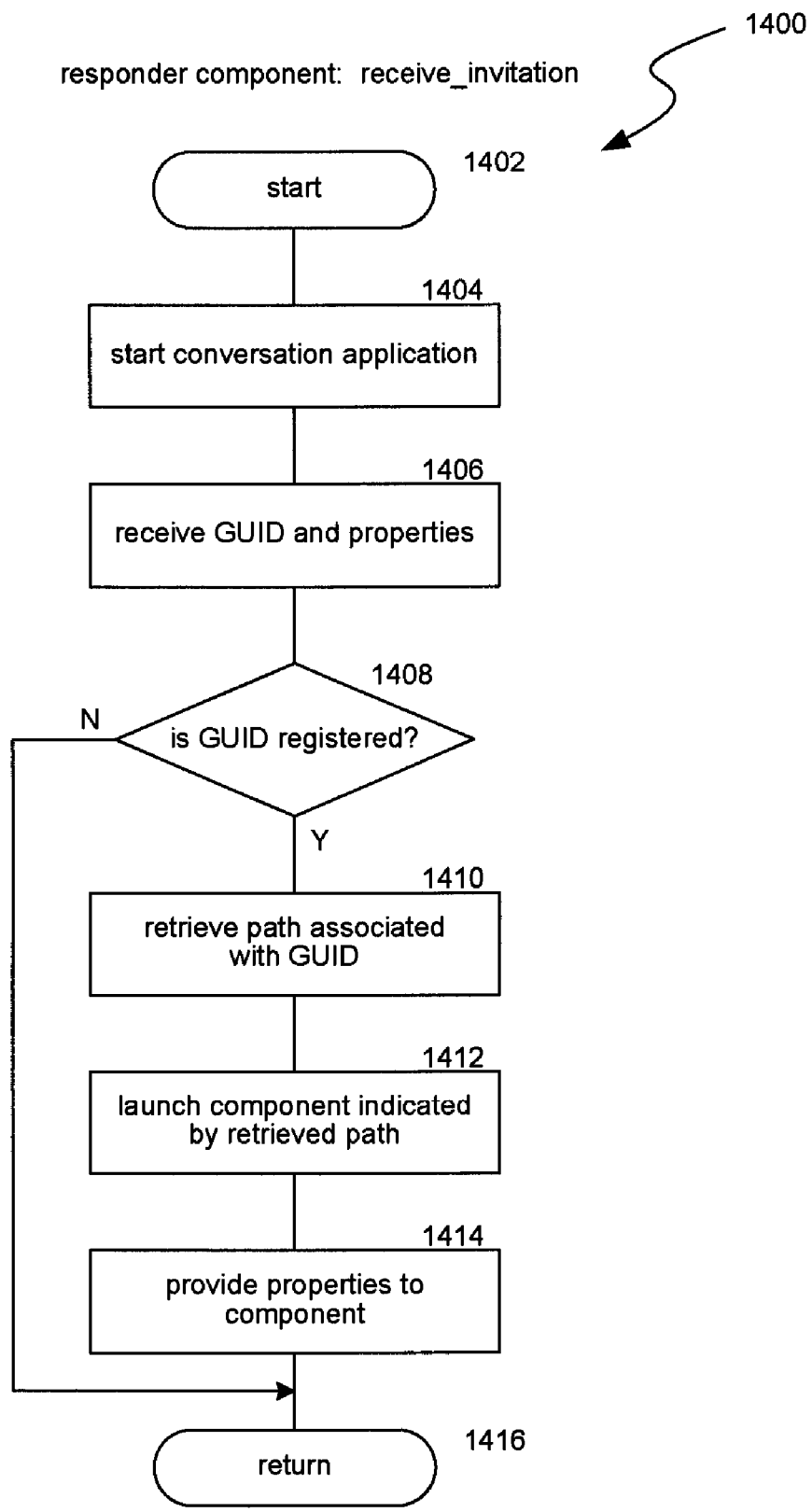
FIG. 14 is a flow diagram illustrating a receive_invitation routine invoked by the facility in various embodiments.

FIG. 14 is a flow diagram illustrating a receive_invitation routine invoked by the facility in various embodiments. A responder component may invoke the routine 1400 when it receives a message inviting the responder to a conversation. The routine begins at block 1402.

At block 1404, the routine starts a conversation application. As an example, the routine can start MICROSOFT OFFICE COMMUNICATOR.

At block 1406, the routine receives a GUID and one or more properties. As an example, the routine receives the properties in an invitation message, such as a SIP INVITE message. The properties can indicate identifiers for a conversation, record or item, and so forth.

At block 1408, the routine determines whether the GUID is registered. As an example, the routine may determine whether the GUID is registered by checking a registry of registered components. If the GUID is registered, the routine continues at block 1410. Otherwise, the routine continues at block 1416, where it returns.

At block 1410, the routine retrieves a path associated with the GUID. As an example, a registry key associated with the GUID may provide a path at which a component is located.

At block 1412, the routine launches the component indicated by the retrieved path. In some embodiments, the component may be an application that is associated with the GUID and that corresponds to the application that caused the invitation message to be sent.

At block 1414, the routine provides one or more of the properties it received at block 1406 to the launched component. As an example, the routine may invoke an API provided by the component and provide one or more of the properties to a method of the API. The launched component or application may then load or display the indicated record or item.

At block 1416, the routine returns.

Those skilled in the art will appreciate that the logic shown in the flow diagrams and discussed above may be altered in various ways. For example, the order of the logic may be rearranged, substeps may be performed in parallel or otherwise, shown logic may be omitted, or other logic may be included, etc.

The facility can be employed with various types of components and applications, including e-mail, web sites, third-party applications, and other applications. The facility was described above as functioning with an e-mail system. Descriptions for using the facility with other application types will now be provided.

When the facility is employed with a web page or other document, the document or the application used to view the document (e.g., a word processor such as MICROSOFT WORD or a web site collaboration tool such as MICROSOFT SHAREPOINT) can be adapted for use with the facility. As an example, an ACTIVEX control, Java applet, script object, or other component can be added to a web page that, when invoked, could invoke a method of the initiator component's API to begin a conversation. This component could determine a unique identifier for the web page (e.g., by checking a URL property using a document object model) and provide the unique identifier for the web page to the initiator component. As another example, a word processor or other application can be modified to employ the facility in a manner similar to third-party applications. Alternatively, document types that support executable extensions, such as via MICROSOFT's "Smart Tags" technology, can employ the executable extensions to interact with the initiator component's API. When invoking the initiator component's API, the components used with web pages or documents can provide a responder's identification, unique identification for the web page or document, and other attributes to establish contextual information.

In some embodiments, these applications may employ the same properties as the MAPI properties described above. In various embodiments, the properties can be provided using an extensible markup language ("XML"), in binary form, in text form, or in other forms that can be communicated between computing devices using a data communications protocol.

In various embodiments, the initiator receives or sends the following properties: PR_CONVERSATION_TOPIC, PR_CONVERSATION_INDEX, PR_ENTRYID, and PR_CONVERSATION_DATA. PR_CONVERSATION_TOPIC, PR_CONVERSATION_INDEX, and PR_ENTRY_ID were discussed above. PR_CONVERSATION_DATA can be used to send additional data, such as a URL that is encoded using XML. This property can also be used to extend the facility. As an example, third-party applications may send additional data in this property that the facility itself may ignore. In some embodiments, the third-party applications can employ the PR_CONVERSATION_DATA property to send a unique identifier for a record or document. Some applications may send a subset of these properties. As an example, the facility may employ only the PR_CONVERSATION_TOPIC, PR_CONVERSATION_INDEX, and PR_ENTRY_ID properties when adapted for use with MICROSOFT OUTLOOK.

The MAPI property names can be renamed to any other property names. As examples, PR_CONVERSATION_TOPIC and PR_CONVERSATION_INDEX can be renamed to MS-CONVERSATION-SUBJECT and MS-CONVERSATION-ID properties in SIP messages, such as in header fields of SIP INVITE messages.

It will be appreciated by those skilled in the art that the above-described facility may be straightforwardly adapted or extended in various ways. As an example, the initiator and responder computing devices may be the same computing device. As another example, various messaging protocols and applications can be employed with the facility. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A computer-readable medium storing computer-executable instructions that, when executed, cause a computer system to perform a method of providing contextual information automatically, the method comprising:
   receiving a Session Initiation Protocol message initiating an instant message conversation, the message containing an indication of contextual information in a header field of the message, the indication automatically added to the message when a first user initiates the conversation in association with the indicated contextual information;
   decoding the indication to determine an identifier for the contextual information; and
   providing a command to a second user for loading the contextual information indicated by the received message.

2. The computer-readable medium of claim 1 further comprising providing the command to the user when the user responds to a telephone call.

3. The computer-readable medium of claim 2 wherein the telephone call employs a Voice over Internet Protocol.

* * * * *